Sept. 20, 1938.  H. D. COLMAN  2,130,875

SELF ADJUSTING HYDRAULIC BRAKE

Filed Feb. 10, 1936  3 Sheets-Sheet 1

Inventor
Howard D. Colman
BY
Parker, Carlson, Pitney & Hubbard
Attorneys.

Sept. 20, 1938.  H. D. COLMAN  2,130,875
SELF ADJUSTING HYDRAULIC BRAKE
Filed Feb. 10, 1936   3 Sheets-Sheet 2
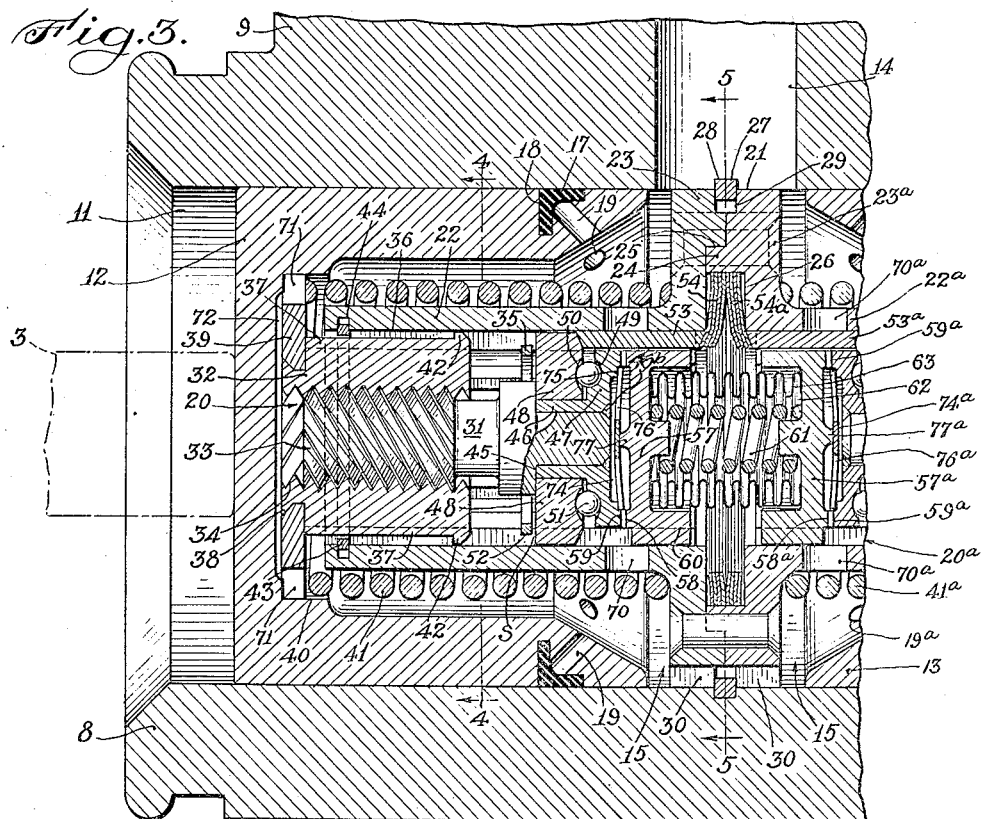
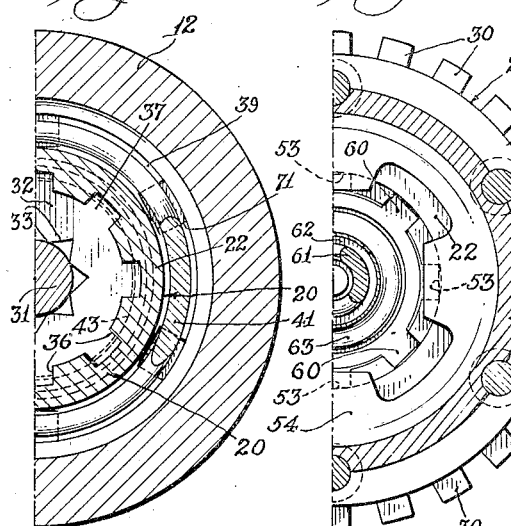
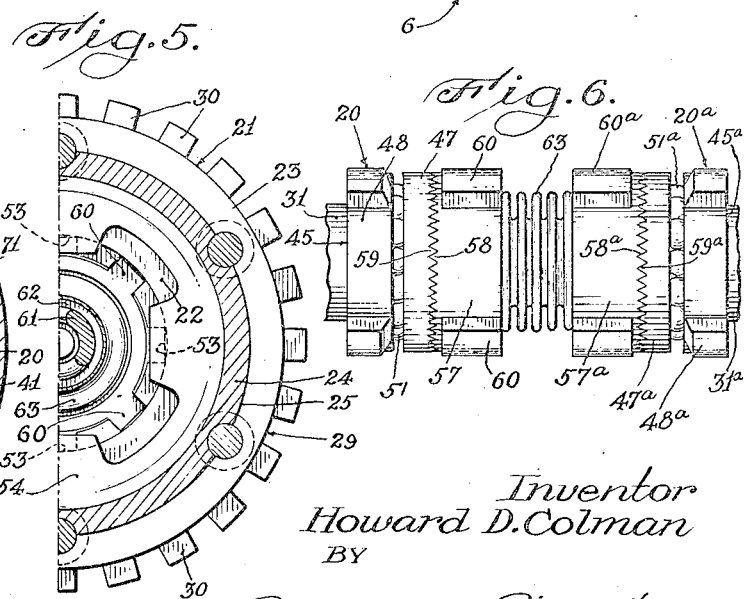
Inventor
Howard D. Colman
BY
Parker, Carlson, Pitner & Hubbard
Attorneys.

Sept. 20, 1938. H. D. COLMAN 2,130,875
SELF ADJUSTING HYDRAULIC BRAKE
Filed Feb. 10, 1936 3 Sheets-Sheet 3

Inventor
Howard D. Colman
By
Parker, Carlson, Pitzner & Hubbard
Attorneys.

Patented Sept. 20, 1938

2,130,875

UNITED STATES PATENT OFFICE 2,130,875

SELF-ADJUSTING HYDRAULIC BRAKE

Howard D. Colman, Rockford, Ill.

Application February 10, 1936, Serial No. 63,130

37 Claims. (Cl. 188—79.5)

The present invention relates generally to improvements in hydraulic wheel brakes, and more particularly to brakes which are self-adjustable to compensate automatically for wear.

One of the primary objects of the present invention resides in the provision of a novel automatic wear adjuster for brakes which is adapted to relieve excessive pressure thereon in the event of over-adjustment due to drum contraction after expansion from heat.

A further object is to provide a clearance seeking brake adjuster which will operate in either direction to maintain automatically as an incident to normal operation of the brake as predetermined clearance.

Another object is to provide a new and improved automatic wear adjuster which is hydraulically controlled to release the parts for adjustment during heavy fluid braking pressure, and to lock the parts against misadjustment during the final brake releasing movement and while the brake is released.

Still a further object is to provide a novel automatic wear adjuster which is hydraulically released for reverse adjustment as an incident to application of the fluid braking pressure in the event of heavy pressures thereon resulting from over-adjustment.

Another object is to provide an adjuster of the foregoing character which is mounted within the hydraulic brake actuator and serves to limit the inward movement of the actuator pistons.

Various other objects reside in the provision of a wear adjuster in which the adjusting parts are hydraulically balanced, in which the moving parts are immersed in and lubricated by the brake fluid, and in which the failure of any parts will not result in the loss of the brake fluid, nor prevent operation of the brake.

Another object resides in the provision of an automatic wear adjuster which is housed within the brake actuator cylinder and the inner ends of the actuator pistons, and in which the adjusting parts have a long and finely graduated range of adjustment.

Various general objects reside in the provision of a new and improved automatic wear adjuster which is simple and inexpensive in construction, efficient, reliable and sensitive in operation, and capable of ready and convenient assembly and resetting.

Further objects and advantages will become apparent as the description proceeds.

In the accompanying drawings, Figure 1 is a side view of a hydraulic brake having an automatic wear adjuster embodying the features of my invention.

Fig. 3 is an axial sectional view on an enlarged scale in the same plane as Fig. 2 of the actuator and adjuster.

Figs. 4 and 5 are fragmentary transverse sectional views taken respectively along lines 4—4 and 5—5 of Fig. 3.

Fig. 6 is a fragmentary side elevation of a novel clutch means forming part of the adjuster.

Figure 1:
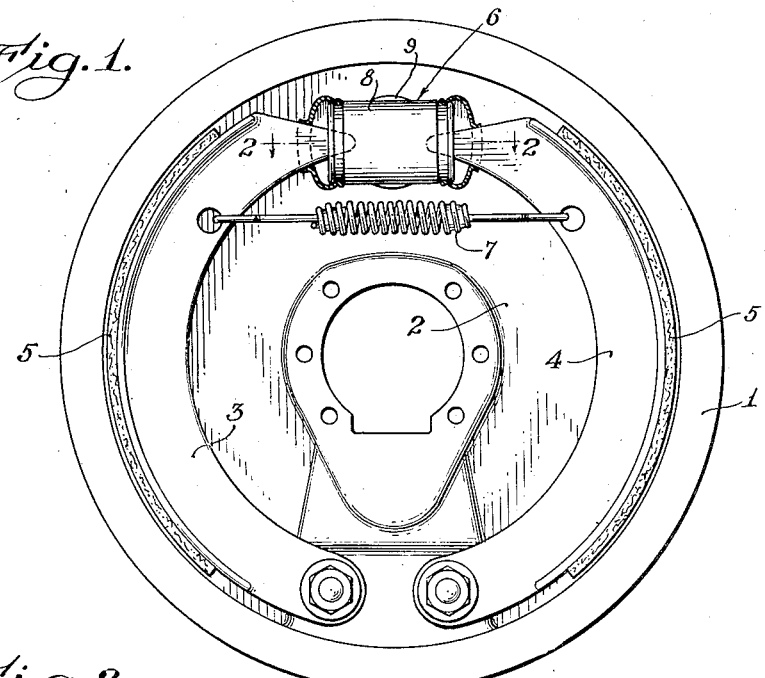
Figure 2:
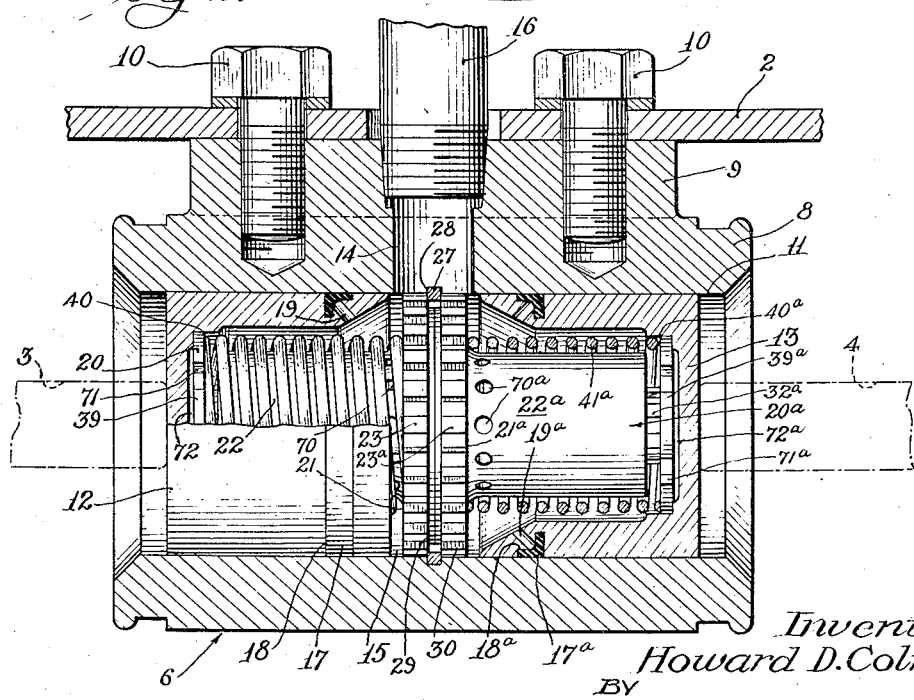
Fig. 2 is a fragmentary longitudinal sectional view of the brake actuator taken along line 2—2 of Fig. 1.
Figure 7:
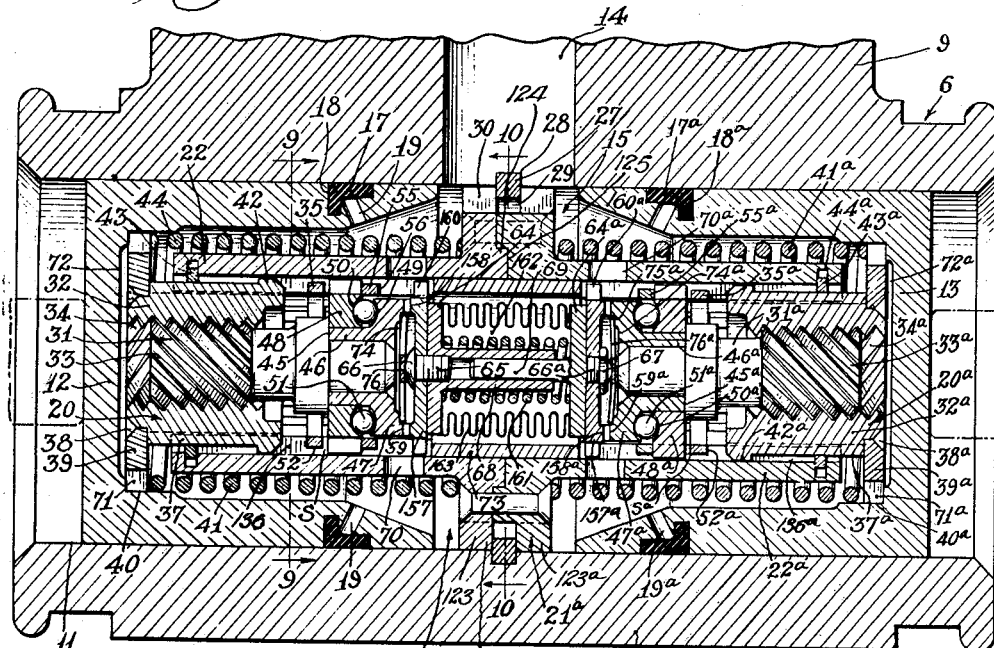

Fig. 7 is an axial sectional view of a modified form of the adjuster.

Figure 8:
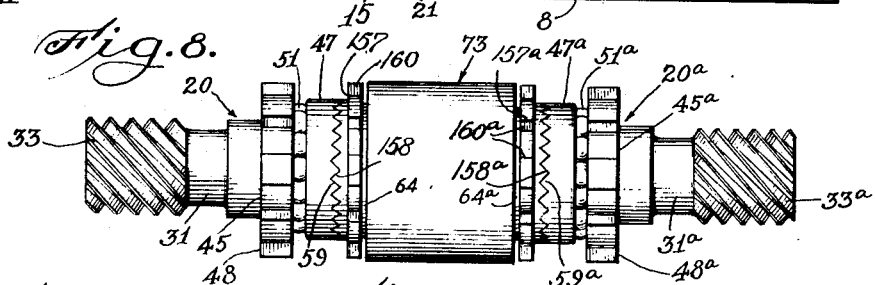

Fig. 8 is an elevational view of part of the internal assembly of the adjuster shown in Fig. 7.

Figure 9:
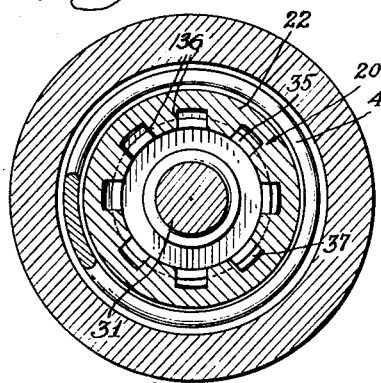
Figure 10:
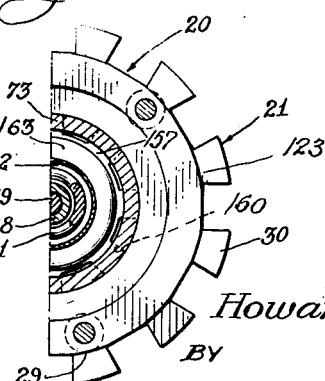

Figs. 9 and 10 are transverse sectional views taken respectively along lines 9—9 and 10—10 of Figs. 7.

Referring more particularly to the drawings, the self-adjuster for compensating for wear is especially adapted for, and hence shown in a specific arrangement in connection with, a hydraulic vehicle brake. It is to be understood, however, that the invention in various of its broad aspects is not limited to any particular form of brake, nor arrangement therein, but is intended to cover all equivalent, modified or alternative constructions coming within the spirit and scope of the appended claims.

The brake, selected for purposes of illustration, comprises a cylindrical drum 1 adapted for rotation with a wheel (not shown), and substantially closed at one end by a stationary backing plate 2. Two arcuate brake shoes 3 and 4 are pivotally anchored on the plate 2, and are faced with a suitable brake lining 5 engageable with the interior of the drum 1. The free ends of the shoes 3 and 4 are operatively related to a hydraulic actuator 6 interposed therebetween, and rigidly mounted on the backing plate 2. A tension spring 7 is connected at opposite ends to the shoes 3 and 4, and tends to retract them out of engagement with the drum 1.

The actuator 6 comprises a cylinder 8 which is integral with a mounting plate 9 secured to the backing plate by means of bolts 10, and which has a bore 11 opening therethrough. Two pistons 12 and 13 are slidably disposed respectively in opposite ends of the bore 11, and are directly engaged at their outer faces by the free ends of the shoes 3 and 4. A fluid inlet passage 14 opens to the center of the bore 11 between the pistons 12 and 13 into a space constituting a pressure chamber 15, and is in communication with a pipe 16 adapted to be connected to a source of pressure fluid, such as a master cylinder (not shown). The leakage of pressure fluid from the chamber 15 to the ends of the bore 11 is prevented by rings 17 and 17ª of a suitable sealing material embedded in peripheral grooves 18 and 18ª in the pistons 12 and 13. These grooves are vented through apertures 19 and 19ª in the pistons to the chamber 15 so that the pressure fluid will act to press the sealing rings 17 against the surface of the bore 11. It will be evident that when the pressure of the fluid in the chamber 15 is built up, the pistons 12 and 13 will be urged apart to apply the shoes 3 and 4, and when the pressure is released, the spring 7 will retract the shoes and cause the pistons to move inwardly.

The invention resides in self-adjusting means for limiting the retractile movement of the shoes 3 and 4 to a predetermined maximum clearance relative to the brake drum 1, and for automatically preventing a greater clearance regardless of wear on the brake linings 5. As a result, the efficiency of the brake is always maintained.

A self-adjusting device is provided for each of the shoes 3 and 4. These devices are indicated generally by the reference characters 20 and 20ª, and are alike in construction so that a description of one will suffice for both. Like parts of the other are identified by the same reference numerals with the addition of the letter a.

In the preferred form of the invention, the two adjusters 20 and 20ª are connected into a unitary structure mounted directly within the expansible pressure chamber 15 of the actuator 6, and are arranged for coaction with, and to define adjustable stops limiting the inward movement of, the pistons 12 and 13. Preferably, the pistons 12 and 13 are hollow and open at their inner or adjacent ends to receive and partially house the adjusters 20 and 20ª.

The adjusters 20 and 20ª comprise a unitary tubular housing with an outer peripheral flange 21 midway of its ends, and fitting snugly within the bore 11. In its preferred form, the housing consists of two oppositely extending sleeves 22, 22ª with contacting end flanges 23, 23ª defining the flange 21. The flange 23ª is formed with a centering boss 24 engaging in a circular recess 25 in the flange 23 and defining an annular internal space 26. A resilient split ring 27 engages in registering annular grooves 28 and 29 respectively in the bore 11 and the flange 21 to hold the housing 22, 22ª, and hence the two adjusters, against longitudinal displacement. It will be evident that the adjusters are accurately centered and held in fixed endwise and coaxial position relative to the bore 11.

Teeth 30 are formed in the periphery of the flange 21, and the interdental spaces afford free and unrestricted intercommunication between opposite ends of the chamber 15 and the passage 14.

The adjuster 20 comprises inner and outer screw members 31 and 32 having coacting non-locking threads 33 and 34. One of the members 31 and 32 is adapted for axial movement with the piston 12, while the other is adapted for engagement with a stop shoulder 35 to limit its outward axial movements. Also, one of the members is mounted for rotation, while the other is non-rotatable. In the present instance, the inner member 31 is rotatable, and adapted to be restrained against substantial outward movement by the shoulder 35, and the outer member 32 is nonrotatable and free to move axially with the piston 12 upon applying and releasing the brake. To this end, the sleeve 22 is formed, as by broaching, with internal splines 36 extending throughout its length, and the nut 32 is formed, as by hobbing, with longitudinal external splines 37 slidably interfitting with the splines 36. Secured to the outer end of the nut 32, as by riveting indicated at 38, is a disk 39 slidably disposed in a bore 40 in the outer end of the piston 12. A coiled compression spring 41, encircling the sleeve 22, engages at opposite ends against the flange 21 and the disk 39, and serves to hold the latter against the inner end face of the piston 12, thereby causing the nut 32 to move outwardly axially with the piston when the fluid pressure is applied.

The splines 37 are formed at their inner ends with raised lugs 42 extending to the full depth of the splines 36, and are reduced in height throughout the remainder of their length. A resilient split ring 43, disposed in an annular groove 44 in the outer end of the sleeve 22, projects into the path of the stop lugs 42 to limit the outward movement of the nut 32. Hence, the piston 12 and the nut 32 are yieldably connected, through the medium of the disk 39 and the spring 22 for joint movement outwardly to the limit position defined by the lugs 42 and the ring 43.

The screw 31 projects inwardly from the nut 32, and is formed with a peripheral enlargement defining a shoulder 45. A sleeve 46 is welded as indicated at 46ᵇ on the inner end of the screw 31 in position against the shoulder 45, and is formed on its inner end with an outer peripheral flange 47. Encircling the sleeve 46 and disposed against the shoulder 45 is a thrust collar 48 which has peripherally spaced splines slidably interengaging with the splines 36. The adjacent end faces of the flange 47 and collar 48 are formed with opposed annular raceways 49 and 50 between and in engagement with which a plurality of ball bearings 51 are disposed. The outer end face of the collar 48 is adapted, after outward movement through a small predetermined distance $s$ defining the desired minimum braking clearance, for engagement with the shoulder 35 which is defined by a resilient split ring projecting inwardly from an annular groove 52 in the bore 11.

It will be evident that the screw members 31 and 32 constitute a self-adjusting device which is movable outwardly as a floating unit with the piston 12 upon actuation of the brake until the collar 48 engages the shoulder 35, and in which any additional movement of the nut 32 will set up an axial stress acting through the screw threads 33 and 34 to effect a relative rotation of the members and hence an automatic elongation of the device.

The predetermined braking clearance $s$ is determined by suitable stop means limiting the retractile movement of the screw 31 relative to the shoulder 35. In Fig. 3, this stop means comprises a plurality of bars 53 slidably disposed in alternate grooves between the splines 36. The outer ends of the bars 53 are adapted for engagement by the thrust collar 48, and the inner ends seat against the inner peripheral margin of an annular laminated diaphragm spring 54 mounted in the recess 26. Preferably, the ends of the bars 53 are beveled and adapted to contact with correspondingly beveled surfaces on the thrust collar 48 and the spring 54 so that longitudinal pressure will tend to urge the bars radially outwardly, thereby avoiding any possibility of interference with the normal operation of the inner parts of the adjuster. The spring 54 is of greater strength than the retractile spring 7 and of sufficient strength to prevent vibration of the related parts, and therefore normally engages the inner edge of the sleeve 22 at all times with initial tension to constitute a fixed stop for the bars 53 and through the latter for the collar 48.

Clutch means is provided for normally preventing rotation of the screw member 31 when the braking pressure is released. In the present instance, this means comprises a clutch element 57 slidably and non-rotatably mounted in the inner end of the sleeve 22, and formed on its outer end face with crown teeth 58 adapted for coacting engagement with similar teeth 59 on the adjacent or inner end face of the flange 47. Preferably, the clutch element 57 is formed on the periphery with splines 60 slidably engaging in interdental spaces between the splines 36. In Fig. 3, the clutch element 57 is in the form of a cup or peripherally flanged disk, and the splines 60 engage in alternate interdental spaces between the bars 53.

The clutch elements 57, 57ª for the two adjusters 20, 20ª are disposed in the intermediate portion of the housing 22, 22ª. A coiled compression spring 61 interposed between and engaging at opposite ends with the elements 57, 57ª tends to separate the latter, and thereby to urge the teeth 58, 58ª outwardly toward or into coacting engagement with the teeth 59, 59ª. The spring 61 is enclosed within a hermetically sealed chamber 62 which may contain air or any other suitable gaseous fluid normally under atmospheric pressure, and which is defined by a corrugated cylindrical bellows 63 having a tight connection at opposite ends with the elements 57, 57ª. In Fig. 3, the bellows 63 is attached directly to the crown clutch elements 57, 57ª, and is reduced in diameter to extend into the annular flanges on the latter.

It will be evident that the elements 57, 57ª, the spring 61 and the bellows 63 constitute a floating self-centering unit normally extensible under spring pressure to effect clutch engagement for both units 20, 20ª. The pressure of the braking fluid is utilized to compress the unit so as to interrupt the clutch engagement during the initial application of the brake. To this end, suitable openings 70, 70ª are formed respectively in the sleeves 22, 22ª for directing pressure fluid from the chamber 15 to the outer end faces of the clutch elements 57, 57ª which constitute the closed movable end walls of the sealed chamber 62. The pressure fluid will pass through suitable openings, preferably defined by the clearance spaces between the teeth 58, 59 and 58ª, 59ª to the outer end faces of the elements 57, 57ª.

The pressure fluid also acts outwardly on the nut and screw device 31, 32. Hence, the disk 39 is formed with peripheral teeth or projections 71 defining interdental spaces for directing pressure fluid from the chamber 15 to a recess 72 in the end face of the bore 40 to balance the nut and screw device 31, 32 hydraulically in all positions of adjustment.

The compressibility of the bellows unit is limited to an extent just sufficient to permit full disengagement of the crown teeth 58, 59 and 58ª, 59ª, thereby preventing undue working of the bellows 63. In Fig. 3, inward movement of the elements 57, 57ª is limited by the springs 54, 54ª which project into the path of the inner ends of the splines 60, 60ª.

The inner end face of the flange 47 is formed with a central recess 74 encircled by an annular notch 75. A flat spring 76, having radial arms seated at their outer ends in the notch 75, is adapted to be flexed into the recess 74 upon engagement at the center by the member 57 when the teeth 58 and 59 are engaged, and hence imparts a resilient force tending to interrupt the clutch connection. In Fig. 3, the spring 76 is adapted for engagement by a small axial projection 77 on the member 57. The spring 76 also serves to impart an outward axial force on the screw 31, tending to rotate the latter in a direction to contract the unit 31, 32, and hence to maintain the collar 48 against the stop 35 for minimum clearance or slack when the crown teeth 58 and 59 are disengaged. The tension of the spring 76 is considerably less than that of the spring 61, and hence the clutch is engaged when the fluid pressure is at or near zero.

In operation under normal conditions, the parts assume the positions illustrated in Fig. 3 when the brake is released. Upon the application of pressure on the fluid in the system, the pistons 12, 13 are caused to move outwardly, thereby moving the shoes 3 and 4 into engagement with the drum 1. Referring to the adjuster 20, it being understood that the adjuster 20ª operates in a similar manner but in the opposite direction, the spring 41 causes the nut 32 to follow and move as a unit with the piston 12. Initially, the screw 31 follows the nut 32 and is held against rotation by the clutch element 57 which is urged outwardly and maintained in engagement therewith by the spring 61. When the heavy braking pressure occurs, the fluid acts to retract the clutch element 57 to separate the teeth 58 and 59, thereby releasing the screw 31 for rotation if the occasion arises.

The adjuster 20 is a predetermined clearance seeking or finding adjuster. Thus, if the brake clearance should not exceed that determined by the normal clearance $s$, the collar 48 initially will not engage the stop 35 at the end of the applying movement, but the spring 76 will cause the screw 31 to rotate in a direction to effect such engagement, thereby automatically establishing $s$ as a minimum clearance. Conversely, if, due to wear on the brake lining 15, the collar 48 engages the stop 35 during and before the end of the applying movement, continued movement of the nut 32 with the piston 12 and the shoe 3 will set up an axial stress causing a reverse rotation of the screw 31, thereby elongating the unit 31, 32 to reestablish the normal clearance.

In releasing the brake, the clutch teeth 58 and 59 are again engaged to lock the screw 31 against rotation immediately after the reduction of the heavy fluid pressure. Thereafter, the spring 7 returns the parts to initial position. If the rotation of the screw 31 during the brake applying movement did not exceed the distance of one tooth 58, the teeth 58 and 59 will cam the screw back into initial position. However, if the rotation exceeded the distance of one tooth 57, a permanent adjustment will be effected to compensate automatically for changed conditions, such as wear, swelling of the brake lining 5 because of moisture or contraction of the drum 1 following expansion by heat, etc.

It will be seen that the maximum braking clearance permitted by the adjuster 20 is determined by the clearance $s$ plus the axial movement of the screw 31 resulting from rotation through the distance of one tooth 58. As repeated adjustments for wear are effected to maintain the desired clearance, the nut 32 is advanced outwardly progressively into successive stop positions to limit the return movement of the piston 12. Since the adjuster 20 acts against the extreme end of the shoe 3, the adjustment is relatively fine for teeth 58 and 59 of a given size.

Since the nut 32 is supported and centered at the outer end by the piston 12, it is permitted an unusually long range of movement and hence adjustment. The outward movement is limited by the stop 43 which will engage the lugs 42 to prevent further adjustment when the lining 5 is worn out and in need of replacement. While the screw 32 may be operatively connected to the piston 12 in any suitable manner, the present resilient connection is particularly advantageous in that it does not render the brake suddenly ineffective when the limit of adjustment is reached. Thus, in the continued use of the brake, the nut 32 will move outwardly into its limit position, and then the piston 12 will move outwardly independently until the brake is fully applied. Since no further adjustments will occur, continued wear will come to the attention of the operator by the perceptible change in the movement of the foot actuator. The resilient connection also has the advantage that at the end of the adjustment stroke, the lugs 42 will not be subjected to and likely to be sheared off by the heavy brake applying force. The only force that the lugs 42 need withstand is that exerted by the spring 41.

The adjuster is automatically operable to prevent breakage of the parts and to permit reverse adjustment in the event of an over-adjustment. This is an important characteristic since under certain conditions over-adjustment is likely to occur due to expansion of the drum at high temperatures followed by contraction on cooling. For example, if the brake is applied frequently and with great force, as may happen when descending a long hill or when making repeated stops from high speeds, the resulting temperature may expand the drum considerably. The adjuster 20 will compensate for expansion. On subsequent cooling, the drum will contract, thereby reducing the braking clearance and in extreme instances locking the brake.

The present adjuster avoids these difficulties. If the contraction exceeds the normal braking clearance, the inward thrust will be transmitted through the screw 31, the collar 48, and the bars 53 to the spring 54. This spring has an initial tension sufficient to resist that of the return spring 7 and the inertia of the parts, but will yield in response to a heavy pressure, thereby preventing the breakage of parts. The clutch member 57 will also be moved inwardly but without materially increasing the pressure of the spring 61.

In the event of any over-adjustment, a single application of the brake will effect a reverse adjustment to reestablish the normal braking clearance. Thus, the pressure of the fluid on the clutch member 57 will effect disengagement of the teeth 58 and 59 to release the screw 31, and thereupon compression exerted by the spring 76 will rotate the screw 31 until the collar 48 engages the shoulder 35. Since reverse adjustment can occur at all times, adjustment in response to distortion of the drum 1 by reason of heavy pressures cannot result in permanent over-adjustment, and hence presents no problem. The novel hydraulically operated clutch means prevents misadjustment of the screw 31 since it locks the latter against rotation during movement through the clearance range and in idle rest position, i. e., at all times when the heavy braking pressure is released, and yet when disengaged permits free and unrestrained operation of the screw in response to adjusting forces.

The construction of the adjuster lends itself to novel and advantageous methods of assembly. Referring to Fig. 3, the sleeves 22, 22a are riveted together, with the springs 54, 54a and the bellows unit, comprising the clutch members 57, 57a, the spring 61 and the bellows 63, in position. The ring 43 then is compressed, inserted into the sleeve 22 and allowed to expand into the groove 44. The sleeve 46, collar 48 and balls 51 are assembled and secured on the inner end of the screw 31. Then, the screw 31 and nut 32 are screwed together, with the ring 35 therebetween. To complete the assembly of the adjuster, the bars 53 are inserted, the spring 41 is disposed about the sleeve 22, and the inter-threaded screw and nut unit is pushed into the sleeve 22 until the contracted ring 35 snaps into the groove 52. In this step, the ring 43 is expanded by end engagement with the collar 48 and the lugs 42, and then assumes its normal position. When thus assembled, all of the parts are locked in operative position. It will be understood that the opposite end of the adjuster is assembled in the same way.

The fully assembled adjuster is now inserted into the cylinder bore 11 until the compressed ring 27 snaps into the central groove 28. Then the two pistons 12 and 13 are inserted into opposite ends of the bore 11.

Mounting of the adjuster directly within the actuator 6 results in the saving of space, permits of a simple, rugged and inexpensive construction, and promotes reliability, safety and sensitivity in operation. It will be evident that the adjusting elements for the two shoes 3 and 4 can be combined in one structure so that certain parts, such as the spring 61, and the bellows 63 need not be duplicated. All of the parts are fully enclosed and protected from dirt and other foreign matter. No outside housing, other than the actuator cylinder, nor seals to prevent the loss and deterioration of lubricant need be provided. The adjuster is immersed in and lubricated by the brake fluid. No extra pipe connections for directing fluid from the brake hydraulic system are required, and failure of fluid controlled parts, such as the bellows 63, will not result in the loss of brake fluid, nor prevent operation of the brake in the same manner as if no adjuster were present. The parts are accurately centered and supported by the actuator cylinder and pistons. Since the adjuster coacts with the ends of the shoes 3 and 4, a fine adjustment is possible, and special adaptation to the shape, arrangement and character of the shoes and other parts of the internal brake assembly is unnecessary.

The modified form of adjuster illustrated in Figs. 7 to 10 is closely similar to that shown in Figs. 1 to 6, and hence like parts are identified by the same reference characters, and only the differences in construction will be specifically described.

In the modified form, the oppositely extending sleeves 22—22a, which define the unitary housing for the adjusters 20 and 20a, have radial flanges 123, 123a defining the flange 21. The flange 123 is formed with a centering boss 124 engaging in a circular recess 125 in the flange 123. The flanges 123 and 123a are in full end face engagement at the inner periphery, thereby eliminating the annular internal space 26 of Fig. 3 and defining a smooth uninterrupted bore midway of the ends of the tubular housing. The sleeves 22 and 22ª are formed with longitudinal internal splines 136 and 136ª which interfit with the splines 37 and 37ª but which do not extend thoughout the length of the housing but terminate short of the flanges 123 and 123ª at opposite ends of the intermediate bore. A sleeve 73 is confined in a fixed axial position by the adjacent ends of the splines 136 and 136ª in the central bore, and serves to hold the sleeves 22 and 22ª accurately in coaxial relation.

It will be understood that the split rings defining the shoulders 35 and 35ª project inwardly from annular grooves 52 and 52ª as in Fig. 3. Inward movement of the screws 31 and 31ª is limited respectively by resilient split rings 55 and 55ª which are disposed in annular grooves 56 and 56ª in the sleeves 22 and 22ª, and which project inwardly into the paths of the collars 48 and 48ª.

The clutch means for normally preventing rotation of the screw members 31 and 31ª, when the braking pressure is released, comprise two circular disks 157 and 157ª which are formed on their outer end faces with crown teeth 158 and 158ª adapted for coacting engagement with the teeth 59 and 59ª on the adjacent or inner end faces of the flanges 47 and 47ª, and which are formed on the periphery with splines 160 and 160ª engaging respectively at all of the interdental spaces between the splines 136 and 136ª.

The clutch elements 157 and 157ª are tightly secured respectively in coaxial relation to two disks or washers 64 and 64ª. Preferably, a bolt 65, having a head 66, is threaded axially through the element 157 into the disk 64, and the disk 64ª has a threaded stud 66ª extending through the element 157ª for engagement with a nut 67 to hold the parts in assembled relation. A coiled compression spring 161, interposed between and engaging at opposite ends with the disks 64, 64ª, tends to separate the latter, and thereby to urge the teeth 158, 158ª outwardly toward or into coacting engagement with the teeth 59, 59ª. The spring 161 is enclosed within a hermetically sealed chamber 162 defined by a corrugated cylindrical bellows 163 having a hermetically sealed connection at opposite ends with the disks 64, 64ª. A tube 68 and stem 69, projecting inwardly respectively from the disks 64, 64ª into telescoping relation, serve to hold the elements 157, 157ª and the bellows 163 in axial alinement, and provide a good bearing without depending on the splines 136, 136ª and 160, 160ª. Since the elements 157, 157ª are not flanged, more space is available so that the bellows 163 in this form may be, and is shown, larger in diameter than the bellows 63 in Fig. 3, thereby providing a larger end pressure area. This construction is particularly advantageous in that it permits assembly of all parts of the bellows unit, excepting the clutch element 157, and testing, before insertion into the housing 22, 22ª. The ends of the sleeve 73 constitute stops in the path of the splines 160, 160ª for independently limiting the inward movement of the clutch elements 157, 157ª. The bolt head 66 and the stud 66ª are adapted for engagement with the springs 76 and 76ª to set up a force tending to interrupt the clutch connections.

To permit rotation of the screws 31, 31ª against the action of the spring 161 in the event of a heavy rotational force, the crown teeth 158, 158ª and 59, 59ª are V-shaped and formed with sides having an included angle greater than that of the corresponding teeth in Fig. 3, and such that when the axial thrust of the screws 31, 31ª is taken up by the stop rings 55, 55ª, the angular force imparted by the non-rotating threads 33 and 34 and 33ª and 34ª, in the event of an excessive axial compressive force, will rotate the screws 31, 31ª to relieve the pressure. The included clutch tooth angle, the lead of the screw threads, and the pressure of the spring 161 are determined and correlated on one hand to prevent rotation of the screws 31, 31ª by the shoe return spring 7 and accelerating forces acting on the parts, and on the other hand to permit rotation in response to pressures otherwise high enough to cause breakage. Friction between the contacting screw parts may be relied upon as a factor of safety.

The method of assembly is generally similar to that of the adjuster shown in Fig. 3. First, the sleeves 22, 22ª are bolted together, with the sleeve 73 and the bellows unit in position. As an alternative, the bellows unit without the element 157 may be inserted through the sleeve 22ª and then the element 157 may be secured to the disk 64 by the bolt 65. Now, the rings 43, 43ª and 55, 55ª are inserted, and the assembly completed as in Fig. 3.

I claim as my invention:

1. In a hydraulic brake, in combination, a stationary support, a rotatable drum, a friction shoe pivoted at one end on said support, a spring for retracting said shoe from said drum, a hydraulic actuator having a cylinder and a piston therein coacting with the free end of said shoe and operable to move said shoe through a braking clearance into engagement with said drum, and adjustable means within said cylinder for limiting the return movement of said piston, said means being automatically self-adjustable in either direction to maintain said clearance substantially constant.

2. In a hydraulic brake, in combination, a stationary support, a rotatable drum, a friction element movably mounted on said support, spring means for retracting said element from said drum, a hydraulic actuator having a cylinder and a cup-shaped piston therein coacting with said element and operable to move said element through a braking clearance into engagement with said drum, and adjustable means within said cylinder and coacting with the inside of said piston for limiting the return movement of said piston.

3. In a hydraulic brake, in combination, a stationary support, a rotatable drum, a friction element movable on said support, spring means for retracting said element from said drum, a hydraulic actuator having a pressure fluid chamber and a piston therein coacting with said element and operable by fluid pressure to move said element through a braking clearance into engagement with said drum, and adjustable mechanical stop means within said chamber coacting directly with said piston to limit the return movement of said piston to said clearance, said means being open to the pressure fluid for lubrication thereby.

4. In a hydraulic brake, in combination, a stationary support, a rotatable drum, a friction element movable on said support, spring means for retracting said element from said drum, a hydraulic actuator having a pressure fluid chamber and a piston therein coacting with said element and operable by fluid pressure to move said element through a braking clearance into engagement with said drum, and means within said chamber comprising a casing and relatively adjustable parts in said casing defining a variable-position stop for positively limiting the return movement of said piston, said casing being formed to direct pressure fluid from said chamber to said parts for lubrication.

5. In a hydraulic brake, in combination, a stationary support, a rotatable drum, a friction element movable on said support, spring means for retracting said element from said drum, a hydraulic actuator having a pressure fluid chamber and a piston therein coacting with said element and operable by fluid pressure to move said element through a braking clearance into engagement with said drum, and stop means within said chamber for limiting the inward movement of said piston, said means comprising a non-rotatable nut movable axially with said piston, yieldable means for causing said nut to follow said piston outwardly, means for limiting the outward movement of said nut, a rotatable screw in non-locking threaded engagement with said nut and movable axially through a limited range, and clutch means normally locking said screw against rotation and responsive to said fluid pressure to release said screw.

6. In a hydraulic brake, in combination, a stationary support, a rotatable drum, a friction element movable on said support, spring means for retracting said element from said drum, a hydraulic actuator having a pressure fluid chamber and a piston therein coacting with said element and operable by fluid pressure to move said element through a braking clearance into engagement with said drum, and stop means within said chamber for limiting the inward movement of said piston, said means comprising two relatively adjustable parts constituting a unit extensible under tension and contractible under compression, spaced abutments for limiting the movement of one of said parts, spring means tending to move said one part outwardly against one of said abutments, and spring means causing the other of said parts to releasably engage and to follow said piston outwardly, and means locking said unit against rotation when said brake is released.

7. A brake clearance adjuster comprising, in combination, an operating stop, a spaced rest stop, two relatively adjustable parts constituting a unit movable between and selectively into engagement with said stops, said unit being extensible under tension when against said operating stop, and means for locking said unit against adjustment when not under tension, said rest stop being yieldable under pressure to relieve excessive compression on said unit.

8. A brake clearance adjuster comprising, in combination, an operating stop, a spaced rest stop, two relatively adjustable parts constituting a unit movable between and selectively into engagement with said stops, said unit being extensible under tension when against said operating stop, and spring actuated clutch means for normally locking said unit against adjustment when said unit engages said rest stop, said clutch means being adapted to slip to relieve excessive compression on said unit.

9. A brake clearance adjuster comprising, in combination, an operating stop, a spaced rest stop, two relatively adjustable parts constituting a unit movable between and selectively into engagement with said stops, said unit being extensible under tension when against said operating stop, floating clutch means for normally locking said unit against adjustment, and means for disengaging said clutch means when said unit is placed under tension.

10. A brake clearance adjuster comprising, in combination, an operating abutment, a spaced rest abutment, an adjustable unit extensible under tension and contractible under compression and comprising a part movable with and adapted to take the return pressure of a movable brake element, and a part movable between and selectively into engagement with said abutments, a floating clutch member movable with said last mentioned part and operable to lock said unit against adjustment, pressure means tending to move said last mentioned part into engagement with said operating abutment and cooperating with said element to place said unit under compression when said clutch member is disengaged, and means operable as an incident to brake application to disengage said clutch element.

11. A brake clearance adjuster comprising, in combination with a brake element movable outwardly in an applying movement and inwardly in a retractile movement, a casing, two spaced operating and rest abutments in said casing, an adjustable unit consisting of a nut member and a screw member extensible under tension, one of said members being non-rotatable and movable axially with said element and having a separable yieldable connection with said element, means for limiting the movement of said non-rotatable member, and the other of said members being rotatable by reaction with said non-rotatable member and having a part confined for axial movement between said abutments, and clutch means for normally locking said rotatable member against rotation and being disengageable as an incident to the applying movement of said element.

12. A brake clearance adjuster comprising, in combination with a brake element movable outwardly in an applying movement and inwardly in a retractile movement, a casing, two spaced operating and rest abutments in said casing, an adjustable unit having a nut and a screw with non-locking coacting threads extensible under tension and contractible under compression, said nut being non-rotatably splined for axial movement in said casing, means for limiting outward movement of said nut, spring means for holding said nut yieldably against said element for movement therewith, said screw being rotatable and having a part confined for axial movement with a predetermined clearance between said abutments, spring means adapted to coact with said element to place said unit under compression and thereby to adjust said part against said operating abutment, and clutch means for locking said screw against rotation and being disengageable as an incident to applying pressure on said element.

13. A brake clearance adjuster comprising, in combination with a brake element movable outwardly in an applying movement and inwardly in a retractile movement, a casing, two spaced operating and rest abutments in said casing, an adjustable unit having a nut and a screw with non-locking coacting threads extensible under tension and contractible under compression, said nut being non-rotatably splined for axial movement in said casing, means for limiting outward movement of said nut, spring means for holding said nut yieldably against said element for movement therewith, said screw being rotatable and having a part confined for axial movement with a predetermined clearance between said abutments, a crown clutch element on one end of said screw, a movable non-rotatable clutch element, spring means urging said movable clutch element to engage and shift with said first mentioned clutch element, and hydraulic means for disengaging said clutch elements when the brake pressure is applied.

14. A brake clearance adjuster comprising, in combination with a brake element movable outwardly in an applying movement and inwardly in a retractile movement, a casing, two spaced operating and rest abutments in said casing, an adjustable unit having a nut and a screw with non-locking coacting threads extensible under tension and contractible under compression, said nut being non-rotatably splined for axial movement in said casing, means for limiting outward movement of said nut, spring means for holding said nut yieldably against said element for movement therewith, said screw being rotatable and having a part confined for axial movement with a predetermined clearance between said abutments, a crown clutch element on one end of said screw, a movable non-rotatable clutch element, spring means urging said movable clutch element to engage and shift with said first mentioned clutch element, hydraulic means for disengaging said clutch elements when the brake pressure is applied, spring means for locating said rest abutment in position and permitting relief movement of said rest abutment in response to excessive retractile compression on said unit, and spring means adapted to coact with said brake element to place said unit under compression when said clutch elements are disengaged to maintain said part against said operating abutment.

15. A brake clearance adjuster comprising, in combination with a brake element movable outwardly in an applying movement and inwardly in a retractile movement, a casing, two spaced operating and rest abutments in said casing, an adjustable unit having a nut and a screw with non-locking coacting threads extensible under tension and contractible under compression, said nut being non-rotatably splined for axial movement in said casing, means for limiting outward movement of said nut, spring means for holding said nut yieldably against said element for movement therewith, said screw being rotatable and having a part confined for axial movement with a predetermined clearance between said abutments, a crown clutch element on one end of said screw, a movable non-rotatable clutch element, spring means urging said movable clutch element to engage and shift with said first mentioned clutch element, hydraulic means for disengaging said clutch elements when the brake pressure is applied, said clutch elements being adapted to slip against the action of said last mentioned spring means to permit contractile adjustment of said unit under heavy retractile compression, and spring means adapted to coact with said brake element to place said unit under compression when said clutch elements are disengaged to maintain said part against said operating abutment.

16. In a brake clearance adjuster having two oppositely acting self-adjusting units with crown clutch elements on their adjacent ends, a common clutch device interposed between said units and comprising, in combination, a tubular housing having longitudinal internal splines, a sleeve in fixed position in said housing, two disks having peripheral splines engaging said first mentioned splines and having crown clutch elements on their remote faces movable into and out of engagement with said first mentioned elements, internally extending coaxial telescoping guide members on said disks, a compression spring encircling said members and tending to separate said disks, a corrugated cylindrical sealed bellows enclosing said spring and hermetically sealed at its ends to said disks, pressure on said faces being operable to urge said disks toward each other and against the ends of said sleeve.

17. In a brake clearance adjuster having two oppositely acting self-adjusting units, a clutch device freely interposed between said units and comprising, in combination, a hermetically sealed and longitudinally compressible and extensible chamber having movable end wall members defining outer end pressure faces and formed with clutch elements adapted for engagement with said units, and spring means tending to elongate said chamber.

18. In a brake clearance adjuster having two oppositely acting self-adjusting units, a clutch device freely interposed between said units and comprising, in combination, a hermetically sealed and longitudinally compressible and extensible chamber having movable end wall members defining outer end pressure faces and formed with clutch elements adapted for engagement with said units, compression spring means in said chamber and tending to separate said members, and stop means for limiting the compression of said chamber.

19. In a brake clearance adjuster having two oppositely acting self-adjusting units, a clutch device freely interposed between said units and comprising, in combination, two axially movable and non-rotatable clutch elements adapted for engagement respectively with said units and defining outer end pressure faces, and a flexible peripheral wall hermetically connected at opposite ends to said elements and defining therewith a sealed chamber, said chamber tending to expand longitudinally.

20. In a brake clearance adjuster having two oppositely acting self-adjusting units, a clutch device freely interposed between said units and comprising, in combination, two axially movable and non-rotatable clutch elements adapted for engagement respectively with said units and defining outer end pressure faces, and a flexible peripheral wall hermetically connected at opposite ends to said elements and defining therewith a sealed chamber, spring means tending to elongate said device, means for guiding and maintaining said elements in axial alignment, stop means for individually limiting the relative approaching movement of said elements, and means for imparting pressure to said faces to disengage said elements from said units.

21. A wear adjuster comprising, in combination with a hydraulic cylinder and pistons in opposite ends and defining an intermediate fluid pressure chamber, two adjustable stops combined in a unitary structure and coacting respectively with said pistons to limit the inward movement thereof, said structure having a peripheral flange intermediate its ends and slidably interfitting with said cylinder to maintain said adjusters in axial alinement with said pistons, complementary peripheral grooves formed respectively in said cylinder and the periphery of said flange, and a split resilient ring contractible into the groove in said flange and when released engaging in both grooves to lock said structure in axial position.

22. A wear adjuster comprising, in combination with a hydraulic cylinder and pistons in opposite ends and defining an intermediate fluid pressure chamber, two adjustable stops combined in a unitary structure and coacting respectively with said pistons to limit the inward movement thereof, said structure being axially slidable in assembly into said cylinder and interfitting therewith to maintain said adjusters in axial alinement with said pistons, complementary peripheral grooves formed respectively in said cylinder and the periphery of said structure, and a split resilient ring contractible into the groove in said structure and when released engaging in both grooves to lock said structure in axial position.

23. A wear adjuster comprising, in combination with a hydraulic cylinder and pistons in opposite ends and defining an intermediate fluid pressure chamber, an elongated cylindrical casing mounted in fixed position in said cylinder and in coaxial relation therewith, two adjuster units mounted respectively in opposite ends of said casing and projecting therefrom to define stops limiting inward movement of said pistons, spring means urging said adjusters outwardly into yieldable operative engagement with said pistons, each of said adjusters being automatically adjustable to maintain a predetermined range of piston movement, stop means for limiting the outward adjustment of said adjusters, and automatic clutch means interposed between said adjusters for locking said adjusters against adjustment, said clutch means comprising oppositely acting axially slidable non-rotatable disks with crown teeth exposed to the fluid pressure in said chamber, compression spring means for urging said disks apart, and a corrugated cylindrical bellows diaphragm hermetically enclosing said spring means, and means for limiting the approaching movement of said disks in response to the fluid pressure.

24. A wear adjuster comprising, in combination with a hydraulic cylinder and pistons in opposite ends and defining an intermediate fluid pressure chamber, an elongated cylindrical casing mounted in fixed position in said cylinder and in coaxial relation therewith, two adjusters mounted respectively in opposite ends of said casing and projecting therefrom to define stops limiting inward movement of said pistons, spring means urging said adjusters outwardly into yieldable operative engagement with said pistons, each of said adjusters being automatically adjustable to maintain a predetermined range of piston movement, and automatic clutch means interposed between said adjusters for locking said adjusters against adjustment, said clutch means being releasable in response to fluid pressure in said chamber.

25. An adjuster comprising, in combination with a cylinder having a cylindrical bore and a hollow piston reciprocable in said bore, a casing mounted in said bore and extending into the inner end of said cylinder, a nut splined in the outer end of said casing and projecting therefrom, spring means for causing said nut to yieldably engage and travel with said piston, a screw in threaded engagement with said nut and having a collar on its inner end, said nut and screw having non-locking threads, an operative stop and a spaced release stop in said casing at opposite sides of and defining a limited range of movement for said collar, an end face clutch element on the inner end of said collar, a non-rotatable axially movable crown clutch element in said casing opposite said first mentioned clutch element, the space between said clutch elements being open to the interior of said cylinder, spring means tending to effect a yieldable engagement between said clutch elements, spring means tending to urge said screw member against said operative stop, and means for limiting the disengaging movement of said movable clutch element.

26. An adjuster comprising, in combination with a cylinder having a cylindrical bore and a hollow piston reciprocable in said bore, a casing mounted in said bore and extending into the inner end of said cylinder, a nut splined in the outer end of said casing and movable with said piston, a rotatable screw in threaded engagement with said nut and having a collar on its inner end, said nut and screw having non-locking threads, an operative stop and a spaced release stop in said casing at opposite sides of and defining a limited range of axial movement for said collar, clutch means normally locking said screw against rotation and being releasable by fluid pressure in said cylinder, and spring means tending to urge said screw member against said operative stop when said clutch means is disengaged.

27. In a hydraulic brake, in combination, a relatively stationary support, a rotatable drum, a resiliently retracted friction element movably mounted on said support within said drum, a hydraulic actuator mounted within said drum for moving said element outwardly through a braking clearance into engagement with said drum, and means for limiting the retractile movement of said element, said means being automatically adjustable upon brake application in a direction to decrease the clearance in response to excessive movement of said element toward said drum and having self-contained resilient means for effecting self-adjustment in the opposite direction to increase the clearance upon insufficient outward movement of said element toward said drum, whereby said means serves when the brake is released to maintain said clearance substantially constant.

28. In a hydraulic brake, in combination, a stationary support, a rotatable drum, a friction element movably mounted on said support, a hydraulic actuator for moving said element through a braking clearance into and out of engagement with said drum, and means for limiting the retractile movement of said element, said means being automatically adjustable in either direction in response to brake application to maintain said clearance substantially constant.

29. In a hydraulic actuator for brakes, in combination, a cylinder having a central pressure chamber, oppositely acting pistons mounted respectively in opposite ends of said chamber, means for supplying brake fluid to said chamber, and adjustable mechanical stop means mounted within said chamber directly between said pistons and immersed in the braking fluid and positively limiting the inward movement of said pistons, said stop means being adjustable to vary independently the inward position of each piston.

30. In a hydraulic actuator for brakes, in combination, a cylinder having a central pressure chamber, oppositely acting hollow pistons mounted respectively in opposite ends of said chamber, means for supplying brake fluid to said chamber, an automatic adjuster mounted in fixed position in said chamber and extending at opposite ends into and in coacting engagement with said pistons, said adjuster limiting the inward movement of said pistons.

31. In a brake, in combination, a fixed support, a rotatable drum, a friction element movably mounted on said support for movement through a braking clearance into and out of engagement with said drum, and lost motion mechanical stop means for limiting the retractile movement of said element, said stop means being automatically adjustable upon application of said element to said drum in opposite directions to maintain said clearance constant regardless of brake wear or expansion and contraction of said drum.

32. In a brake, in combination, a fixed support, a rotatable drum, a friction element movably mounted on said support for movement through a braking clearance into and out of engagement with said drum, and lost motion stop means for limiting the retractile movement of said drum, said stop means being automatically operable in response to the movement of said element to maintain said clearance substantially constant, clutch means for locking said stop means positively in adjusted position during brake release periods, and hydraulic means for rendering said clutch means ineffective during brake application.

33. A compensating device for maintaining a predetermined operating slack comprising, in combination, means defining an idle rest stop and a spaced opposed operating stop, a self-adjusting unit having two relatively rotatable screw members with non-locking coacting threads and having a lost motion between said stops and being adjustable in axial length through relative rotation in one direction when subjected to an axial force in one direction while against said operating stop, normally closed clutch means operable to prevent relative rotation of said members, and fluid pressure responsive means operable to open said clutch means.

34. A compensating device for maintaining a predetermined operating slack in hydraulic brakes comprising, in combination, means defining an idle rest stop and a spaced opposed operating stop, a self-adjusting unit having two relatively rotatable screw members with non-locking coacting threads and having a lost motion between said stops and being adjustable in axial length through relative rotation in one direction when subjected to an axial force in one direction while against said operating stop, clutch means movable axially with and yieldably engageable with said unit to prevent relative rotation of said members, and hydraulic means responsive to the pressure of the braking fluid for disengaging said clutch means upon application of the brake.

35. A compensating device for maintaining a predetermined operating slack comprising, in combination, an elongated tubular case, a movable end face clutch element in said case, a unit having a non-rotatable screw member projecting from one end of said case and having a second screw member adapted for limited axial movement in said case and for rotation to effect axial adjustment of said first mentioned member, an end face clutch element on said rotatable member for coacting with said first mentioned element, spring means tending to maintain said elements in engagement, and hydraulic means for disengaging said elements.

36. A vehicle brake comprising, in combination, a stationary support, a rotatable drum, a brake shoe pivotally anchored at one end to said support, an actuator operatively related to the other end of said shoe and being movable out of a predetermined idle position to engage said shoe with said drum, an adjustable clearance stop for said actuator, and yieldable means tending to retract said actuator against said stop, said stop including a self-adjustable non-locking screw device automatically extensible in response to axial tension and compressible in response to abnormal pressure exerted thereon by said drum acting through said shoe and said actuator.

37. A compensating device comprising, in combination, a fixed casing having a longitudinally splined bore, a longitudinally splined nut and rotatable screw with non-locking threads and constituting a unit extensible under axial stress, a peripheral longitudinally splined collar on said screw, a compressible split spring ring encircling said screw, a rest abutment in said bore, a pair of spaced annular grooves in said bore, an expansible split spring ring in the outermost groove, said unit and first mentioned ring in assembly being insertable into said bore past said last mentioned ring until said first mentioned ring springs into the other of said grooves to confine said collar for a limited axial movement between said first mentioned ring and said abutment, lugs on said nut engageable with said last mentioned ring, and releasable clutch means for locking said screw against rotation.

HOWARD D. COLMAN.